US012209993B2

(12) United States Patent
Song et al.

(10) Patent No.: US 12,209,993 B2
(45) Date of Patent: Jan. 28, 2025

(54) FULL-LENGTH VIBRATION EXCITABLE COMPONENT DEVICE FOR MEASURING STRENGTH OF ROCK AND CEMENTITIOUS MATERIAL

(71) Applicant: YUNLONG LAKE LABORATORY OF DEEP UNDERGROUND SCIENCE AND ENGINEERING, Xuzhou (CN)

(72) Inventors: Lei Song, Xuzhou (CN); Hao Shi, Huainan (CN); Houquan Zhang, Xuzhou (CN); Yu Wang, Xuzhou (CN); Guozhu Wang, Xuzhou (CN); Huayun Zhao, Xuzhou (CN); Chuanxin Rong, Huainan (CN); Wei Long, Huainan (CN)

(73) Assignee: YUNLONG LAKE LABORATORY OF DEEP UNDERGROUND SCIENCE AND ENGINEERING, Jiangsu (CN)

( * ) Notice: Subject to any disclaimer, the term of this patent is extended or adjusted under 35 U.S.C. 154(b) by 40 days.

(21) Appl. No.: 18/294,484

(22) PCT Filed: Mar. 5, 2022

(86) PCT No.: PCT/CN2022/079440
§ 371 (c)(1),
(2) Date: Feb. 1, 2024

(87) PCT Pub. No.: WO2023/087575
PCT Pub. Date: May 25, 2023

(65) Prior Publication Data
US 2024/0272124 A1     Aug. 15, 2024

(30) Foreign Application Priority Data

Nov. 19, 2021   (CN) .......................... 202111383985.7

(51) Int. Cl.
*G01N 29/04*     (2006.01)
*G01N 3/34*      (2006.01)

(52) U.S. Cl.
CPC .............. *G01N 29/045* (2013.01); *G01N 3/34* (2013.01); *G01N 2291/0232* (2013.01)

(58) Field of Classification Search
CPC . G01N 29/045; G01N 3/34; G01N 2291/0232
(Continued)

(56) References Cited

U.S. PATENT DOCUMENTS 6,671,224 B1 * 12/2003 Pabon .............. G10K 11/17875
166/254.2
8,853,870 B2 * 10/2014 Moss ........................ F03G 7/08
290/1 R
(Continued)

FOREIGN PATENT DOCUMENTS

| CN | 104748660 Y | 7/2015 |
| CN | 209132820 A | 7/2019 |

(Continued)

OTHER PUBLICATIONS

International Search Report (PCT/CN2022/079440 ) ; Date of Mailing: Apr. 26, 2022.

*Primary Examiner* — Jacques M Saint Surin
(74) *Attorney, Agent, or Firm* — Valet Patent Service Limited

(57) ABSTRACT

Disclosed is a full-length vibration excitable component device for measuring the strength of a rock and a cementitious material. The device comprises a steel rod member (1), a vehicle body (2), a vibration motor (3), a frequency measurement element (4), and an integrated lead harness (5); wherein, the steel rod member (1) has a through slot (6) in its interior, the vehicle body (2) is placed in the through slot (6), and the top of the vehicle body (2) is provided with a first mounting slot and a second mounting slot. In the device, a steel rod members (1) such as a reinforcing steel bar and an anchor rod widely used in geotechnical engineering and structural engineering is utilized as "signal generator", the interior of the steel rod member (1) is grooved for installing a movable vibration excitation apparatus and a frequency measurement element arranged therein, and the positions of the vibration excitation apparatus and the frequency measurement element are accurately determined by using an integrated lead harness (5) with scales, thereby realizing operations of performing excitation and signal collection at any position along the full length of the metal rod member. Moreover, the vibration excitation apparatus and detection (Continued)

element of the device can be recycled and reused, thereby facilitating maintenance, such that the detection cost can be significantly reduced.

4 Claims, 2 Drawing Sheets

(58) Field of Classification Search
USPC .......................................................... 73/570
See application file for complete search history.

(56) References Cited

U.S. PATENT DOCUMENTS

| 10,101,483 B2* | 10/2018 | Pabon | G01V 1/46 |
| 10,483,451 B2* | 11/2019 | Wang | H10N 30/85 |
| 11,300,557 B1* | 4/2022 | Bi | G01L 5/00 |

FOREIGN PATENT DOCUMENTS

| CN | 111024816 Y | 4/2020 |
| CN | 111562312 A | 8/2020 |
| CN | 114088615 | 2/2022 |
| JP | 2021009072 A | 1/2021 |

* cited by examiner

FULL-LENGTH VIBRATION EXCITABLE COMPONENT DEVICE FOR MEASURING STRENGTH OF ROCK AND CEMENTITIOUS MATERIAL

TECHNICAL FIELD

The present disclosure relates to a field of material strength measuring devices, and more particularly, to a full-length vibration excitable component device for measuring the strength of a rock and a cementitious material.

BACKGROUND

In the field of underground engineering, acquiring strength information of a rock and a cementitious material accurately and comprehensively is of great significance for risk assessment of a tunnel, a slope, and a building structure. At present, the commonly used methods for measuring the strength of a rock and a cementitious material mainly include a core drilling test method, an ultrasonic velocity method, a rebound method, a pull-out method, and the like. Among them, the core drilling test method and the pull-out method may cause damage to an original structure and thus are not suitable for large-scale adoption; the rebound method only targets a structural surface and thus is not suitable for strength measurement of large-volume cementitious material specimens such as concrete; and the ultrasonic velocity method is highly affected by environmental interference, and a measurement result thereof only represents an average result within a measurement range, and thus cannot accurately provide the material strength at a designated location.

In view of the above-described situations, the team of the first inventor of the present disclosure applies a patent application with Application No. 202010421408.1, entitled "Detection System and Method for Evaluating Damage Condition of Rocks and Cementitious Materials". In this application, it is proposed to detect the strength of material by using a vibration frequency of a metal rod piece coupled with the material. However, an actual operation process shows that when the metal rod piece is short (not more than 0.8 m), a full-length range of the rod piece can be detected only through vibration excitation at an outer end; and when the metal rod piece is long (greater than 0.8 m), an anchor rod vibration waveform obtained only through vibration excitation at the outer end of the metal rod piece attenuates quickly and thus is difficult to transmit to a tail of the rod piece, such that an effective waveform is "submerged" in a noise waveform and cannot be recognized. In addition, in this original invention, a frequency measurement element needs to be stuck in advance, which is non-recyclable and has a fixed detection position. Therefore, it is obvious that a component device capable of exciting vibration and collecting information in a full-length range is of great significance for more comprehensively and accurately measuring the strength in different positions of large-scale rock and cementitious material specimens.

SUMMARY

In order to solve the above-described problems, the present disclosure provides a full-length vibration excitable component device for measuring the strength of a rock and a cementitious material. The technical solutions of the present disclosure are as follows.

A full-length vibration excitable component device for measuring the strength of a rock and a cementitious material, includes a steel rod member, a vehicle body, a vibration motor, a frequency measurement element and an integrated lead harness. Wherein, the steel rod member has a through slot in its interior, and the vehicle body is placed in the through slot; the top of the vehicle body is provided with a first mounting slot and a second mounting slot respectively; the frequency measurement element is fixedly mounted in the first mounting slot, and the vibration motor is fixedly mounted in the second mounting slot; lower ends of the frequency measurement element and the vibration motor both run through to a position below the vehicle body; and the integrated lead harness is fixedly mounted on one side of the vehicle body.

Further, the interior of the vehicle body is provided with a driving motor, which powers walking wheels of the vehicle body; the driving motor in the vehicle body is a servo motor, which may rotate in both forward and reverse directions; and the vehicle body has a maximum speed of 0.02 m/s.

Further, a main body of the vehicle body is a remote-control electric trolley; the interior of the vehicle body is provided with a power module; and the driving motor and the vibration motor in the vehicle body are both powered by the power module.

Further, one end of the integrated lead harness is electrically connected to the frequency measurement element and the vibration motor, and the other end of the integrated lead harness is electrically connected to an external host.

Further, the through slot is designed as a curved wall; the bottom of the through slot in the curved wall design is designed as a flat bottom; the steel rod member has an outer diameter of 28 mm; and the steel rod member is coupled with the rock or the cementitious material.

Further, the top and sides of the vehicle body are each fixedly equipped with a stability guarantee structure; a side of the stability guarantee structure that is away from the vehicle body is attached to an inner wall of the through slot; and a main body of the stability guarantee structure is a wheel disc.

Further, a surface of the integrated lead harness is engraved with a scale line; and the frequency measurement element is powered through the integrated lead harness.

Further, the frequency measurement element and the vibration motor are each fixedly equipped with a magnet in their bottom ends; and the bottom of the magnet is attached to the bottom of an inner cavity of the through slot.

The technical solutions of the present disclosure have the following advantageous effects. In the existing technology of measuring the strength of the material by using the vibration frequency of the coupled metal rod piece, the vibration excitation point is only limited to the outer end of the metal rod piece, and the anchor rod vibration waveform obtained in such vibration excitation mode attenuates quickly. When the length of the metal rod piece is greater than 0.8 m, the vibration waveform is difficult to transmit to the other end of the rod piece, such that the effective waveform is "submerged" in a noise waveform and cannot be recognized. In addition, the frequency measurement element involved and adopted in the existing detection technology needs to be stuck in advance, which is non-recyclable, and has a fixed measurement position. In the present disclosure, a steel rod member such as a reinforcing steel bar and an anchor rod widely used in geotechnical engineering and structural engineering is utilized as "signal generator", the interior of the steel rod member is grooved for installing a movable vibration excitation apparatus and a frequency measurement element arranged therein, and the positions of the vibration excitation apparatus and the frequency measurement element are accurately determined by using an integrated lead harness with scales, thereby realizing operations of performing excitation and signal collection at any position along the full length of the metal rod member. Moreover, the vibration excitation apparatus and detection element according to the present disclosure can be recycled and reused, thereby facilitating maintenance, such that the detection cost can be significantly reduced.

BRIEF DESCRIPTION OF THE DRAWINGS

In order to clearly illustrate the embodiments of the present disclosure, the drawings that will be mentioned in description of the embodiments are briefly described in the following. It is obvious that the described drawings are only related to some embodiments of the present disclosure. Based on the drawings, those ordinarily skilled in the art may acquire other drawings, without any inventive work.

Figure 1:
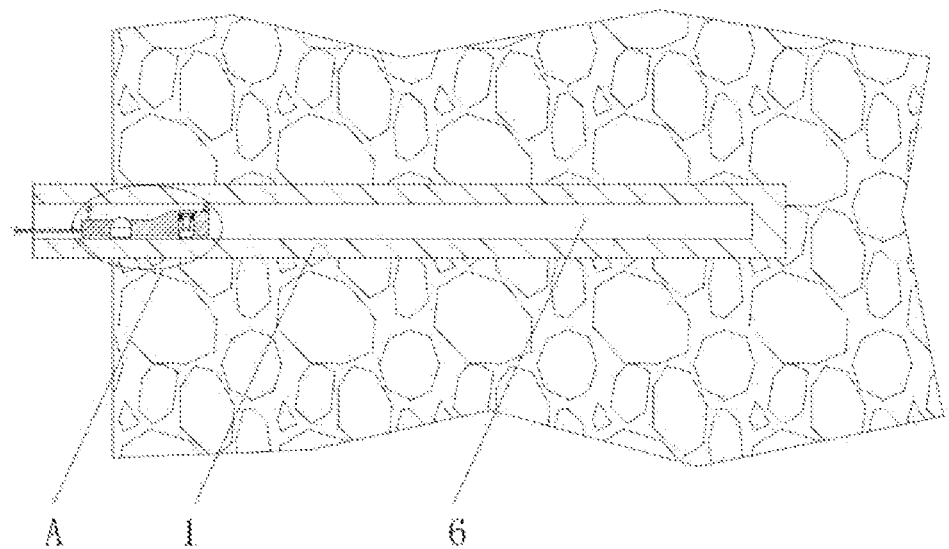
FIG. 1 shows a schematic diagram of an actual measuring state according to the present disclosure.

Reference signs are as follows:

1—steel rod member; 2—vehicle body; 3—vibration motor; 4—frequency measurement element; 5—integrated lead harness; 6—through slot; 7—stability guarantee structure; and 8—magnet.

DETAILED DESCRIPTION OF THE EMBODIMENTS

The technical solutions in the embodiments of the present disclosure will be described in a clearly and fully understandable way in combination with the drawings. It is obvious that the described embodiments are just a part but not all of the embodiments of the present disclosure. Based on the embodiments in the present disclosure, those ordinarily skilled in the art may acquire other embodiment(s), without any inventive work, which shall be within the scope of the present disclosure.

As shown in FIG. 1 to FIG. 4, a full-length vibration excitable component device for measuring the strength of a rock and a cementitious material includes a steel rod member 1, a vehicle body 2, a vibration motor 3, a frequency measurement element 4, and an integrated lead harness 5. Wherein, the steel rod member 1 has a through slot 6 in its interior, and the vehicle body 2 is placed in the through slot 6; the top of the vehicle body 2 is provided with a first mounting slot and a second mounting slot; the frequency measurement element 4 is fixedly mounted in the first mounting slot, and the vibration motor 3 is fixedly mounted in the second mounting slot; lower ends of the frequency measurement element 4 and the vibration motor 3 both run through to a position below the vehicle body 2; and the integrated lead harness 5 is fixedly mounted on one side of the vehicle body 2.

Preferably, the interior of the vehicle body 2 is provided with a driving motor, which powers walking wheels of the vehicle body 2. The driving motor in the vehicle body 2 is a servo motor, which may rotate in both forward and reverse directions. The vehicle body 2 has a maximum speed of 0.02 m/s. Since the servo motor is mounted in the vehicle body 2, the vehicle body 2 is able to move forward and backward, and has an adjustable speed.

Preferably, the main body of the vehicle body 2 is a remote-control electric trolley, the interior of the vehicle body 2 is provided with a power module, and the driving motor and the vibration motor 3 in the vehicle body 2 are both powered by the power module. The remote-control electric trolley in the device is of a non-steel design, and is operated remotely through an external remote-control equipment.

Preferably, one end of the integrated lead harness 5 is electrically connected to the frequency measurement element 4 and the vibration motor 3, and the other end of the integrated lead harness 5 is electrically connected to an external host. In the device, the vibration form (such as waveform, frequency, and amplitude) of the vibration motor 3 as well as parameters of the frequency measurement element 4 such as collection time and frequency are all set through the external host.

Preferably, the through slot 6 is designed as a curved wall, and the bottom of the through slot 6 in the curved wall design is designed as a flat bottom; the steel rod member 1 has an outer diameter of 28 mm; and the steel rod member 1 is coupled with a rock or a cementitious material. Since the through slot 6 is designed as a curved wall and has a flat bottom, it may create conditions for smooth movement of the vehicle body 2 and may ensure that there is no tilting phenomenon during movement of the vehicle body 2.

Preferably, the top and sides of the vehicle body 2 are each fixedly equipped with a stability guarantee structure 7; a side of the stability guarantee structure 7 that is away from the vehicle body 2 is attached to an inner wall of the through slot 6; and the main body of the stability guarantee structure 7 is a wheel disc. The setting of the stability guarantee structure 7 may ensure that the vehicle body 2 runs in a straight line inside the through slot 6 without any deviation from the track.

A specific example of the present disclosure is as follow.

As shown in FIG. 1, the steel rod member 1 is coupled with the rock or the cementitious material through embed pouring or drill mounting. The adopted steel rod member 1 has already undergone a slot opening operation before coupling with the material. The remote-control electric trolley equipped with the vibration motor 3 and the frequency measurement element 4 is placed in the through slot 6.

Figure 2:
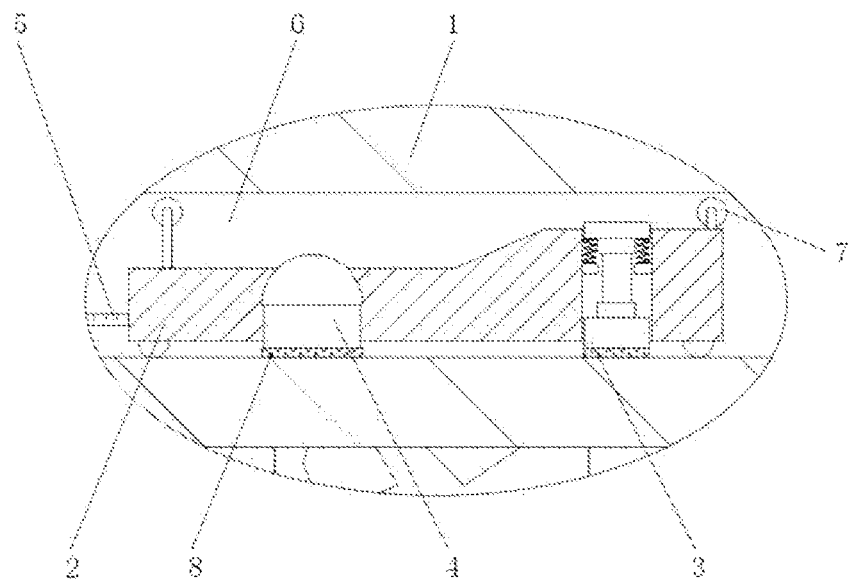
FIG. 2 shows a partially enlarged view of position A in FIG. 1 according to the present disclosure.
Figure 3:
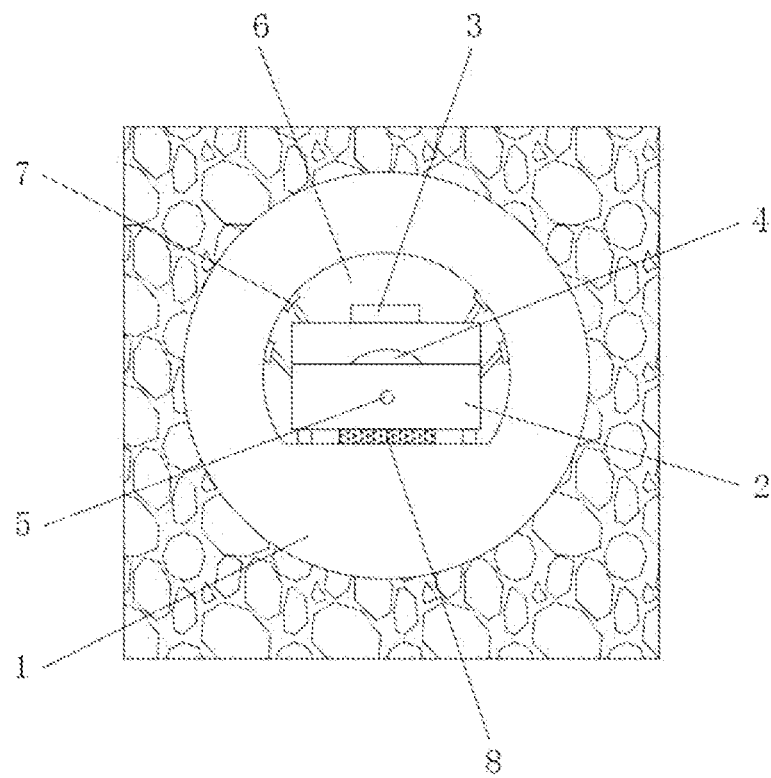
FIG. 3 shows a left side view of the steel rod member and the vehicle body according to the present disclosure.

As shown in FIG. 2, the bottom ends of the frequency measurement element 4 and the vibration motor 3 are each fixedly equipped with a magnet 8, the bottom of which is attached to the bottom of the inner cavity of the through slot 6. The setting of the magnet 8 will ensure that the vibration motor 3 and the frequency measurement element 4 are attached to the inner wall of the through slot 6, such that the vibration motor 3 could drive the steel rod member 1 to vibrate together, while the frequency measurement element 4 could vibrate synchronously with the steel rod member 1.

Figure 4:
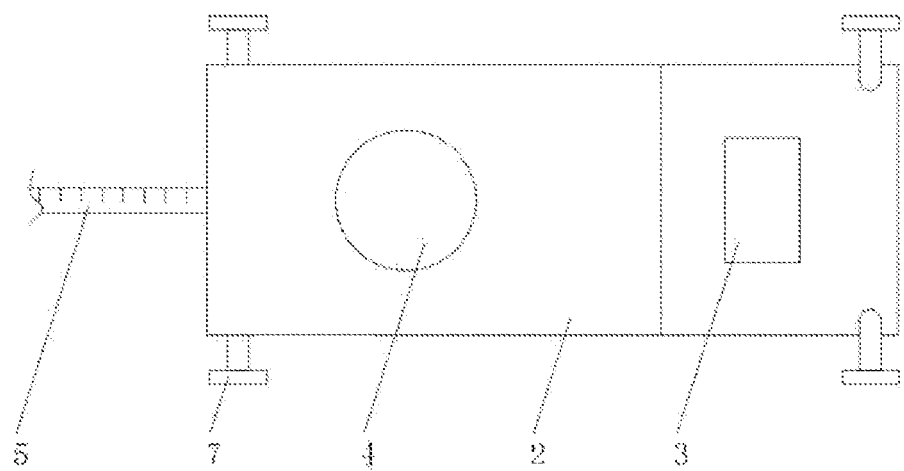
FIG. 4 shows a top view of the vehicle body according to the present disclosure.

As shown in FIG. 4, a surface of the integrated lead harness 5 is engraved with a scale line. The frequency measurement element 4 is powered through the integrated lead harness 5. The travel distance of the vehicle body 2 in the through slot 6 could be recognized through the scale line on the integrated lead harness 5. In addition, the device may also have the distance measured by an external light detection and ranging (LiDAR) device, to accurately obtain a measured position of the vehicle body 2.

An operation principle of the device is as follow: the vehicle body 2 is remotely controlled through an external remote-control equipment, and could drive the vibration motor 3 and the frequency measurement element 4 to move forward and backward; based on the integrated lead harness 5 with a scale line, the vibration motor 3 and the frequency measurement element 4 could be transferred to a designated position of the steel rod member 1; then, signal collection instructions and specific forms of vibration instructions are given successively to the frequency measurement element 4 and the vibration motor 3 respectively, such that the vibration frequency in the designated position of the steel rod member 1 could be collected, and further the strength of the material coupled therewith in the designated position of the steel rod member 1 could be obtained through inversion operation of the patent "Detection System For Evaluating Damage Condition of Rocks and Cementitious Materials".

The preferred embodiments of the present disclosure disclosed above are only intended to assist in elucidating the present disclosure. The preferred embodiments are not fully described with all details, and the present disclosure is not limited to the specific embodiments as described. Obviously, many modifications and changes may be made based on the content of this specification. The purpose of selecting and specifically describing these embodiments in this specification is to better explain principles and practical applications of the present disclosure, thereby enabling those skilled in the art to better understand and utilize the present disclosure. The present disclosure is limited only by the claims and full scope and equivalents thereof.

What is claimed is:

1. A full-length vibration excitable component device for measuring the strength of a rock and a cementitious material, comprising: a steel rod member (1), a vehicle body (2), a vibration motor (3), a frequency measurement element (4) and an integrated lead harness (5); wherein the steel rod member (1) has a through slot (6) inside, the vehicle body (2) is placed in the through slot (6), and the top of the vehicle body (2) is provided with a first mounting slot and a second mounting slot; the frequency measurement element (4) is fixedly mounted in the first mounting slot, and the vibration motor (3) is fixedly mounted in the second mounting slot; lower ends of the frequency measurement element (4) and the vibration motor (3) both run through to a position below the vehicle body (2); and the integrated lead harness (5) is fixedly mounted on one side of the vehicle body (2);

the through slot (6) is designed as a curved wall, and the bottom of the through slot (6) in the curved wall design is designed as a flat bottom; the steel rod member (1) has an outer diameter of 28 mm; and the steel rod member (1) is coupled with the rock or the cementitious material;

the top and sides of the vehicle body (2) are ach fixedly equipped with a stability guarantee structure (7); a side of the stability guarantee structure (7) that is away from the vehicle body (2) is attached to an inner wall of the through slot (6); and a main body of the stability guarantee structure (7) is a wheel disc;

the bottom ends of the frequency measurement element (4) and the vibration motor (3) are each fixedly equipped with a magnet (8), and the bottom of the magnet (8) is attached to the bottom of an inner cavity of the through slot (6); and a surface of the integrated lead harness (5) is engraved with a scale line, and the frequency measurement element (4) is powered through the integrated lead harness (5).

2. The full-length vibration excitable component device for measuring the strength of a rock and a cementitious material according to claim 1, wherein the interior of the vehicle body (2) is provided with a driving motor, which powers walking wheels of the vehicle body (2); the driving motor in the vehicle body (2) is a servo motor, which is configured to rotate in both forward and reverse directions; and the vehicle body (2) has a maximum speed of 0.02 m/s.

3. The full-length vibration excitable component device for measuring the strength of a rock and a cementitious material according to claim 2, wherein a main body of the vehicle body (2) is a remote-control electric trolley; the interior of the vehicle body (2) is provided with a power module; and the driving motor and the vibration motor (3) in the vehicle body (2) are both powered by the power module.

4. The full-length vibration excitable component device for measuring the strength of a rock and a cementitious material according to claim 1, wherein one end of the integrated lead harness (5) is electrically connected to the frequency measurement element (4) and the vibration motor (3), and the other end of the integrated lead harness (5) is electrically connected to an external host.

* * * * *